(12) United States Patent
Nakamura

(10) Patent No.: US 6,626,614 B2
(45) Date of Patent: Sep. 30, 2003

(54) THROW-AWAY CUTTING TOOL

(75) Inventor: Naohiro Nakamura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/069,972

(22) PCT Filed: Jul. 12, 2001

(86) PCT No.: PCT/JP01/06066

§ 371 (c)(1),
(2), (4) Date: Jul. 3, 2002

(87) PCT Pub. No.: WO02/05990

PCT Pub. Date: Jan. 24, 2002

(65) Prior Publication Data

US 2002/0172569 A1 Nov. 21, 2002

(30) Foreign Application Priority Data

| Sep. 13, 2000 | (JP) | 2000-277526 |
| Jul. 14, 2000 | (JP) | 2000-214687 |
| Jan. 29, 2001 | (JP) | 2001-019738 |

(51) Int. Cl.⁷ .............................................. B23B 5/02
(52) U.S. Cl. .................. 408/59; 407/48; 408/230; 408/233; 408/713
(58) Field of Search ...................... 407/48, 103; 408/57, 408/59, 144, 231, 233, 230, 713

(56) References Cited

U.S. PATENT DOCUMENTS

| 1,746,716 A | * | 2/1930 | Sasse ............................ 408/59 |
| 2,739,496 A | * | 3/1956 | Fleischer ........................ 408/206 |
| 2,877,535 A | * | 3/1959 | Williams ........................ 407/3 |
| 3,629,919 A | * | 12/1971 | Trevarrow, Jr. ................. 407/103 |
| 4,655,655 A | * | 4/1987 | Schurfeld ....................... 409/232 |
| 4,950,108 A |   | 8/1990 | Roos |
| 5,924,826 A | * | 7/1999 | Bystrom et al. ................ 407/103 |
| 5,947,660 A |   | 9/1999 | Karlsson et al. |
| 6,146,060 A | * | 11/2000 | Rydberg et al. ................ 407/40 |
| 6,220,794 B1 | * | 4/2001 | Calamia et al. ................. 407/40 |
| 6,524,034 B2 | * | 2/2003 | Eng et al. ....................... 408/59 |

FOREIGN PATENT DOCUMENTS

| DE | 3448086 | 8/1985 |
| EP | 348371 | 12/1989 |
| JP | 49-91889 | 11/1972 |
| JP | 54-71284 | 5/1979 |
| JP | 61-75909 | 5/1986 |
| JP | 11504269 | 4/1999 |
| JP | 2001503683 | 3/2001 |
| WO | 9634714 | 11/1996 |

* cited by examiner

Primary Examiner—Daniel W. Howell
(74) Attorney, Agent, or Firm—Greenblum & Bernstein, P.L.C.

(57) ABSTRACT

In order to improve durability, machining stability, machining accuracy, etc. of a throwaway cutting tool in which a cutting head having a cutting edge is detachably mounted to the tip of a tool body using a clamping tool so that its function can be regenerated by replacing the cutting head, protrusions 8, 16 having their height gradually increasing and recesses 9, 15 having their depth gradually increasing from the center toward outer periphery of the tool are formed alternately with each other in a radial arrangement on the front surface of the tool body 2 and a support surface of the cutting head 3, which is formed by sintering, respectively. The protrusions and recesses, which are provided so that their positions correspond to each other, are conically engaged, thereby centering the cutting head and preventing its movement.

10 Claims, 12 Drawing Sheets

THROW-AWAY CUTTING TOOL

TECHNICAL FIELD TO WHICH THE INVENTION BELONGS

This invention relates to a throwaway cutting tool such as a throwaway rotary cutting tool e.g. a drill or a throwaway tool. The throwaway cutting tools used here mean head exchangeable tools but include a type of tools in which a cutting edge formed on the cutting head is reground and the cutting head is changed when such regrinding becomes impossible.

PRIOR ART

Among known throwaway rotary cutting tools, there is one disclosed in JP patent publication 11-504269. With the cutting tool of this publication, a cutting head (cutting portion) having a cutting edge is detachably coupled to the tip of a tool body having a shank by applying a clamping force with a pull rod to allow regeneration of functions by replacing the cutting head. Protrusions and recesses are formed opposite to each other on the front surface of the tool body and a support surface of the cutting head to be brought into abutment with the former surface to obtain a wedging effect, and the protrusions and recesses are fitted together to transmit torque, and also to increase the clamping force between the tool body and the cutting head when the thrust force applied to the tool increases.

Besides, there is one in which, as in JP patent publication 2001-503683, protrusions and recesses for fitting are provided in an X arrangement on two imaginary lines that intersect at an acute angle on the center of rotation.

Problems the Invention Intends to Solve

With the tool disclosed in JP patent publication 11-504269, since the directions of the protrusions and recesses provided on the front surface of the tool body and the support surface of the cutting head are unified in one direction, torque transmission during cutting is done only through some of the protrusions and recesses, so that stress concentration occurs at such some of the protrusions and recesses. Thus, endurance problem tends to occur particularly during high-load cutting.

Also, dimensions of the cutting head made of cemented carbide (pitch of the protrusions and recesses provided on the support surface) vary due to delicate change in shrinkage factor due to variations in the sintering conditions, so that adhesion of the cutting head to the tool body worsens. This will worsen runout accuracy during setting and thus have a bad influence on the machining accuracy and cutting performance.

Further, in machining an oblique hole with a drill, lateral load is applied to the cutting head. By bearing this load on the pull rod, the cutting head is prevented from moving. But since the pull rod is at the center of rotation, which is apart from the load-application point (outer periphery) on the cutting head, the moment applied to the pull rod increases. Besides, since the pull rod has a long length and the absolute amount of elongation tends to increase due to pulling, when it is subjected to a lateral load, the pull rod is drawn, so that fixing of the cutting head becomes unstable, which may lead to chipping of the cutting edge.

In contrast, with the tool of the JP patent publication 2001-503683, since the protrusions and recesses are provided on the imaginary lines in a cross arrangement with reference to the central axis of rotation, lowering of the fitting accuracy due to dimensional change resulting from unbalanced transmission of cutting torque or heat shrinkage decreases compared with the above-described prior art. But since the protrusions and recesses are simple and small in number, reliability of torque transmission and durability are insufficient. Also, since coupling is done by means of a pull rod, rigid fixation of the cutting head cannot be desired.

With cutting tools used with workpieces rotating, such as boring bars, there are ones in which a cutting head (cutter tip) is mounted to the tip of a tool body (shank) by protrusion-to-recess fitting, as in German patent No. 3448086.

Among these tools, there are ones in which V-fitting recesses and protrusions are provided at three locations in a radial arrangement to clamp the cutting head with six surfaces. But this cannot insure centering accuracy and clamp stability unless the fitting surfaces are finished with high accuracy. Also, since the cutting force is borne at three locations, the recesses and protrusions tend to be fatigued or damaged. On the other hand, there are ones in which one square shaft and one square hole are formed at the axial portion and fitted together. But some clearance is left between the square shaft and the square hole, so that the cutting head (insert) tends to move by the cutting force by an amount of the clearance, so that the cutting edge tends to chip.

Means to Solve the Problems

In order to solve the above problems, according to this invention, a plurality of protrusions and recesses extending from the center of the tool toward its outer periphery and having V-shaped sections are provided radially and alternately with each other on a front surface of the tool body and a support surface of the cutting head which is brought into abutment with the front surface. Also, the protrusions have their height gradually increasing and the recesses have their depth gradually increasing from the center of the tool toward its outer periphery.

With a tool having a sufficient space, the cutting head is fixed by two bolts. Specifically, the cutting head is formed with two bolt holes with seats that are parallel to the axis so as to extend from the front surface of the cutting head through the support surface thereof on both sides of the center of the tool of the cutting head, and the cutting head is clamped to the tool body by bolts inserted through the bolt holes.

With a tool having an oil hole such as a drill, an oil hole is provided in the tool body and the cutting head at the center thereof so as to branch in the cutting head and the branched portions of the oil hole communicate with the bolt holes with the outlets of the branched portions of the oil hole formed by the inlets of the bolt holes.

With a tool having in its outer periphery two helical flutes that are symmetrical with respect to the center, an oil hole is formed in the tool body and the oil hole extends through the axis of the tool body and branches in a V-shape in the tool body. Branched portions of the oil hole open to the intersection of the front surface and outer peripheral surface of the tool body near a heel, and oil grooves opening to the helical flutes are formed in the outer periphery of the cutting head by cutting out the heel so as to communicate with the outlets of the branched portions of the oil holes.

With a tool having no cutting edge at the center of the tip, the cutting head may be fixed to the tool body with a single clamping screw passed through the center of the cutting head. For a small-diameter tool, which has little room for the space, this structure is suitable.

Besides, for a tool having at least the cutting head formed of a sintered material, the sintered skin on the engaging protrusions on the cutting head may remain without being removed.

This invention is also applicable to a gun drill for forming deep holes. In this case, a tool body is formed which has a section perpendicular to the axis that is a ¾ circle and a straight groove in its outer periphery and a plurality of protrusions and recesses of V-shaped section extending from the center of the drill toward its outer periphery are provided radially and alternately with each other on a front surface of the tool body and a support surface of the cutting head. The protrusions have their height gradually increasing and the recesses have their depth gradually increasing from the center of the drill toward its outer periphery. The protrusions and the recesses are arranged radially and have their height and depth varying in a radial direction.

With the throwaway gun drill, a fixing bolt formed with an oil hole along its axis is inserted into a bolt hole with a seat formed in the cutting head at a position offset from the axis of the cutting head and tightened into the support member to couple the cutting head to the support member. The bolt hole is in communication with a cavity of the pipe portion through the oil holes provided in the fixing bolt and the support member. Advantageously oil holes are separately formed in the support member and the cutting head so as to communicate with the cavity in the pipe portion, or the groove surface of the straight groove formed in the cutting head may be higher than that of the straight groove formed in the tool body.

Further, for both gun drills and other tools than a gun drill, a coating film of a hard material may be formed on the surface of the cutting head, or the cutting edge of the cutting head may be formed of sintered diamond or cBN sintered material.

Function

Since the engaging protrusions and recesses provided on the front surface of the tool body and the support surface of the cutting head so as to correspond to each other are radially arranged around the tool center, torque during cutting is transmitted while acting on the respective protrusions and recesses in a direction perpendicular to the longitudinal direction, so that stresses applied to the protrusions and recesses are distributed. This suppresses e.g. fatigue of the fitting portions and chipping of the protrusions due to stress concentration.

Since the height and depth of the protrusions and recesses, which have V-shaped sections, have their height and depth varied so as to increase toward the outer diameter of the tool, their widths narrow gradually toward the tool center. Thus, by increasing the number of the protrusions and recesses, it is possible to markedly increase the area of the fitting surfaces through which torque is transmitted. Also, while the transmission torque is larger on the large-diameter side of the tool than at the center of rotation, if the height and depth of the protrusions and recesses are varied so as to increase toward the outer diameter, the allowance for fitting is larger toward the outer diameter, so that torque can be transmitted ideally. Thus, it is possible to effectively suppress fatigue of the fitting surfaces and prevent chipping of the protrusions.

Also, due to the radial arrangement, even if the shrinkage factors at different portions should vary according to change in conditions during sintering, the pitch of the protrusions and recesses would not be affected. Thus, even if the sintered skin of the protrusions and recesses is left as it is by omitting cutting to lower the cost, the adhesion between the tool body and the cutting head would not worsen. Further, by varying the height of the protrusions and the depth of the recesses in a diametrical direction, the front surface of the tool body and the support surface of the cutting head conically fit. This also produces the centering function, thus increasing the run-out accuracy during setting.

Besides, with the one in which the cutting head is fixed by two bolts provided on both sides of the tool center, burden applied to the bolts due to formation of an oblique hole is distributed. Also, since the bolts are located on the outer-diameter side not at the tool center, the moment is smaller, so that drawing of the bolts due to lateral loads is suppressed, thus increasing stability of fixing.

Also, with the one in which the two bolt holes are also used as outlets of the oil holes, internal oil supply is possible by providing oil holes even in a small-diameter tool having a small extra space.

With the one in which the oil hole is branched in the tool body and open to the intersecting portion of the front surface and the outer periphery of the body near the heel, cutting oil blown out from the branched oil holes flows through the oil grooves formed in the outer periphery of the cutting head into the helical flutes to which the oil grooves open, so that cutting oil can easily reach the cutting edge. Also, by increasing the sectional area of the branched oil hole or oil grooves, the discharge pressure decreases, so that it is possible to increase the effect of flowing chips away with cutting oil by supplying a large amount of cutting oil. Further, since there is no need to provide an oil hole in the cutting head, the head can be easily manufactured. This is advantageous in the cost too.

With a gun drill, if the supply amount of cutting oil is insufficient, the life of the cutting edge will be short, and such problems as clogging with chips tend to arise. Thus, the number of fixing bolt used as oil holes should be one and an oil hole should be formed separately. The diameter of the special oil hole can be made larger in diameter than the oil hole formed in fixing bolts, so that it is possible to increase the amount of cutting oil supplied to the cutting edge by providing such a special oil hole.

Also, if the groove surface of the straight groove formed in the cutting head is provided higher than that of the straight groove formed in the tool body, chip will be caught by the joint.

EMBODIMENTS OF THE INVENTION

FIGS. 1–8 show an embodiment of the throwaway cutting tool of this invention (shown is a drill). The drill 1 comprises a tool body 2 (hereinafter simply referred to as body), a cutting head (drill head) 3, and two bolts 4 (see FIGS. 3 and 8) fixing the cutting head 3 to the tip of the body 2.

Figure 1:
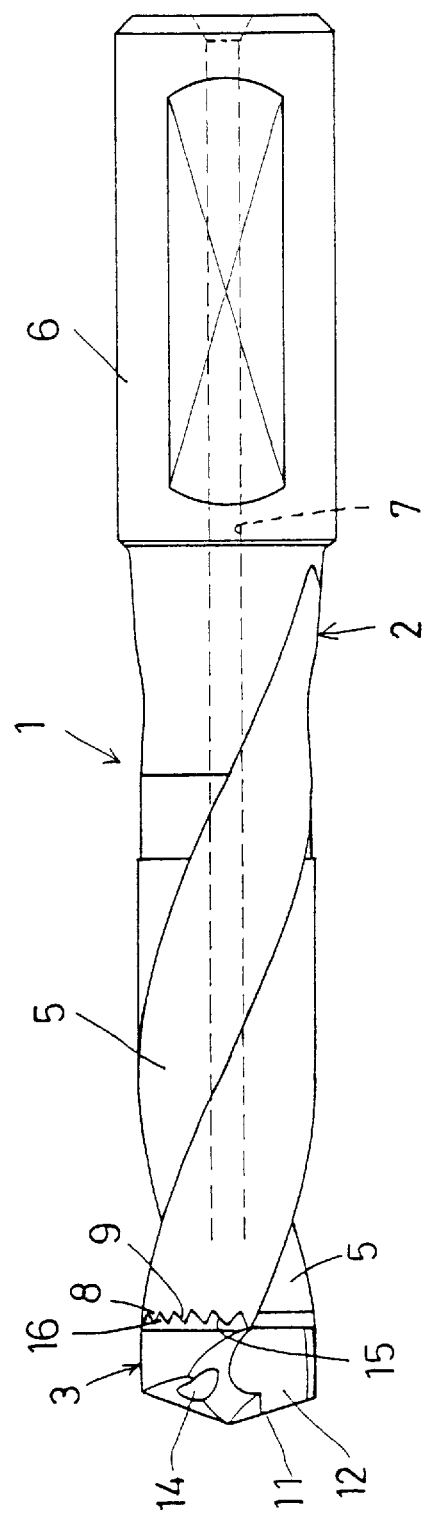
FIG. 1 is a side view of a drill to which this invention is applied.
Figure 2:
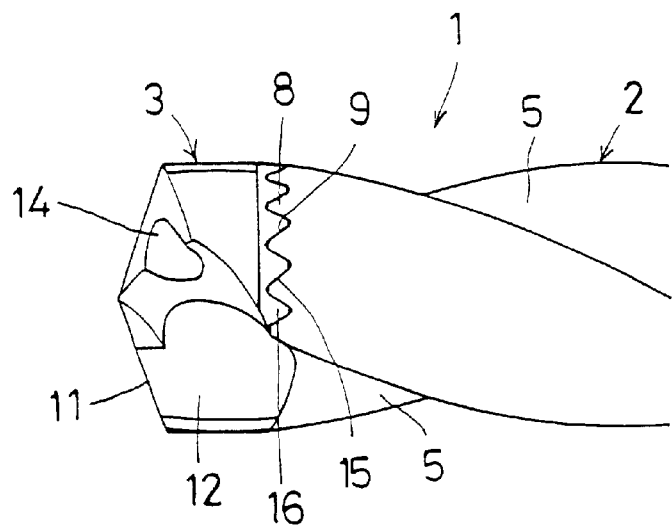
FIG. 2 is an enlarged side view of the tip of the drill.
Figure 4:
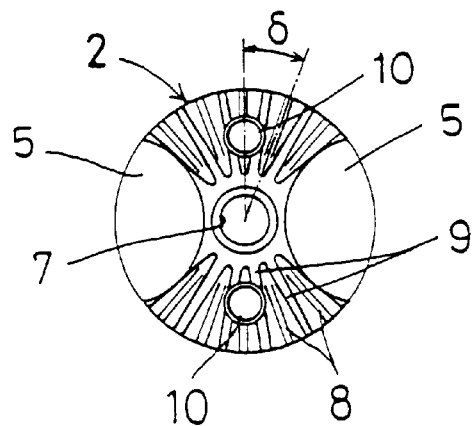
FIG. 4 is an end view showing the front surface of the body.

The body 2 is formed with two helical flutes 5 for discharging chip on its outer periphery. Also, as shown in FIG. 1, it has a shank 6 at its rear portion and is formed with an oil hole 7 extending through its axis. As shown in FIG. 4, on the front surface of the body 2, a plurality of protrusions 8 and recesses 9 are provided alternately in the circumferential direction. Further, two threaded holes 10 are formed symmetrically with respect to the center of rotation to receive bolts 4.

Figure 6:
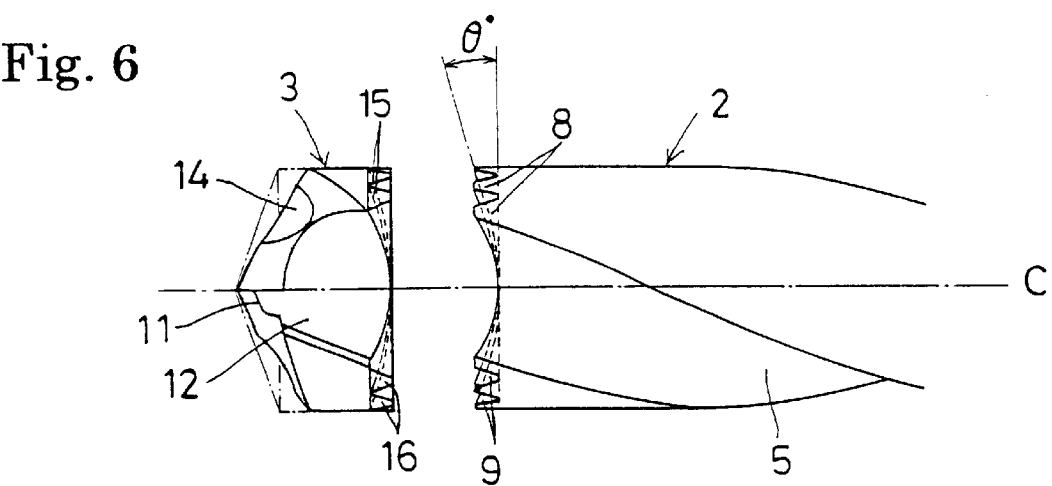
FIG. 6 is a view as seen in the direction A of FIG. 3 with the body and the cutting head disengaged from each other.
Figure 7:
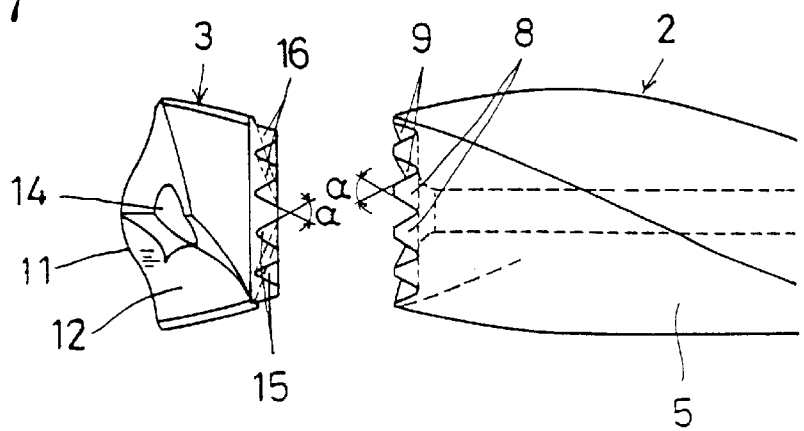
FIG. 7 is a view as seen in the direction B of FIG. 3 with the body and the cutting head uncoupled.

The protrusions 8 and recesses 9 are arranged radially at the pitch of δ° with the center of rotation as a reference (FIG. 4). Also, as shown in FIG. 6, the protrusions 8 have their height gradually increasing from their inner end toward outer end, and the recesses 9 have their depth gradually increasing from their inner end toward outer end. The bottoms of the recesses 9 are on a plane perpendicular to the center of rotation C, and the ridges of the protrusions 8, which are inclined at an angle θ° with respect to a line perpendicular to the center of rotation, are on a concave conical surface. But the ridges of the protrusions 8 may be on a plane perpendicular to the center of rotation while the bottoms of the recesses 9 may be on a convex conical surface.

Figure 3:
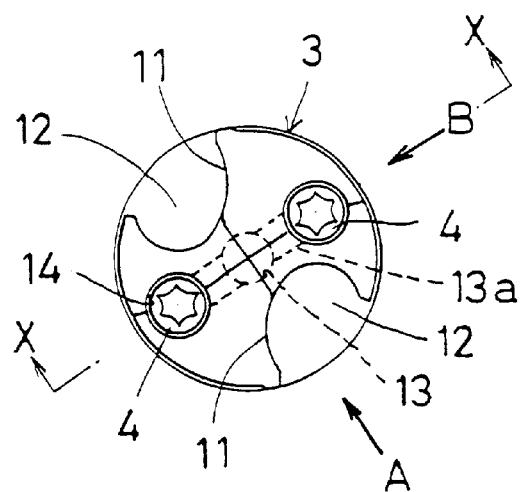
FIG. 3 is a front view of the drill.
Figure 8:
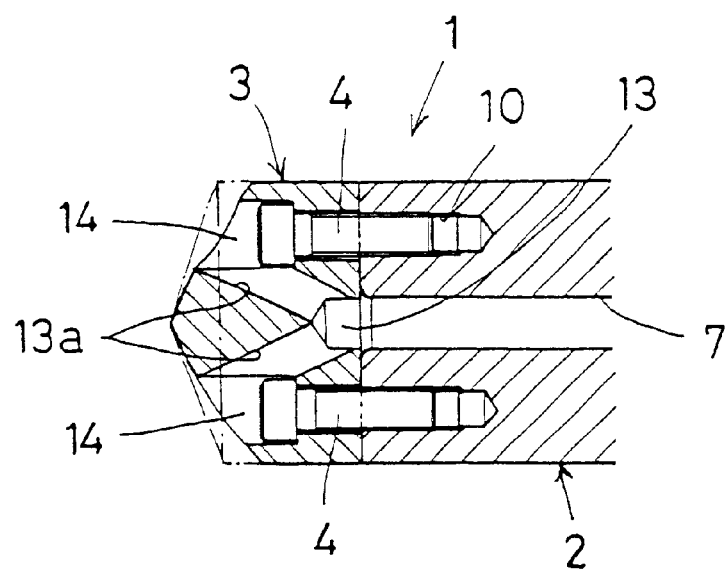
FIG. 8 is a sectional view along line X—X of FIG. 3.

As shown in FIG. 3, the cutting head 3 has at its tip two cutting edges 11 that are symmetrical with respect to the center of rotation, and has on the outer periphery two helical flutes 12 connecting with the helical flutes 5 formed in the body. Also, as shown in FIG. 8, it has an oil hole 13 communicating with the oil hole 7 of the body and branching into two holes 13a. Further, it has two bolt holes 14 with seats that extend from a flank at the tip to a support surface at the rear.

Figure 5:
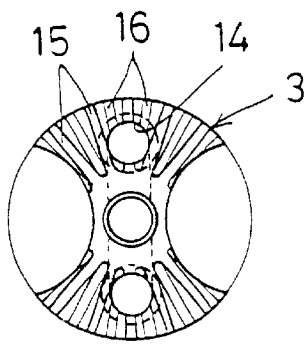
FIG. 5 is an end view of the support surface of the cutting head.

On the support surface of the cutting head 3, recesses 15 and protrusions 16 associated with the protrusions 8 and recesses 9 on the front surface of the body are provided in a radial arrangement as shown in FIG. 5. As shown in FIG. 6, to receive the protrusions 8, the recesses 15 have their depth gradually increasing from their inner ends toward outer ends, and the protrusions 16 have their height gradually increasing from their inner ends toward outer ends so as to correspond to the recesses 9.

Also, the protrusions 8 and the recesses 15 in which the former fit, and the protrusions 16 and the recesses 9 in which the former fit, all have a V section (see FIG. 7) so that fitting between them produces a wedge effect.

The angle (pitch angle δ of FIG. 4) of the mutually fitting protrusions 8 and recesses 15 and the protrusions 16 and recesses 9, the taper angle (α of FIG. 7) of the protrusions 8, 16 and recesses 9, 15, and the inclination angle (θ of FIG. 6) of the ridges of the protrusions 8 and the valleys of the recesses 15 should be determined to suitable values because they affect the number of protrusions, depth of engagement, strength of the protrusions, axial component force that acts on the fitting surfaces during cutting (that is the force that tends to separate the cutting head from the body). Suitable values are $\delta=10°–45°$, $\alpha=45°–90°$, and $\theta=5°–43°$.

As shown in FIG. 8, branch holes 13a of the oil holes 13 communicate with the inlets of the bolt holes 14. In the state of FIG. 8 in which the bolts 4 have been put into the bolt holes 14 and tightened to fasten the cutting head 3 to the body 2, the heads of the bolts 4 sink into the cutting head 3, so that the inlets of the bolt holes 14 serve as outlets of the oil hole. The inlets of the bolt holes 14 are partially at such positions as to open to thinning grooves so that cutting oil will easily flow into the helical flutes 12.

Figure 9:
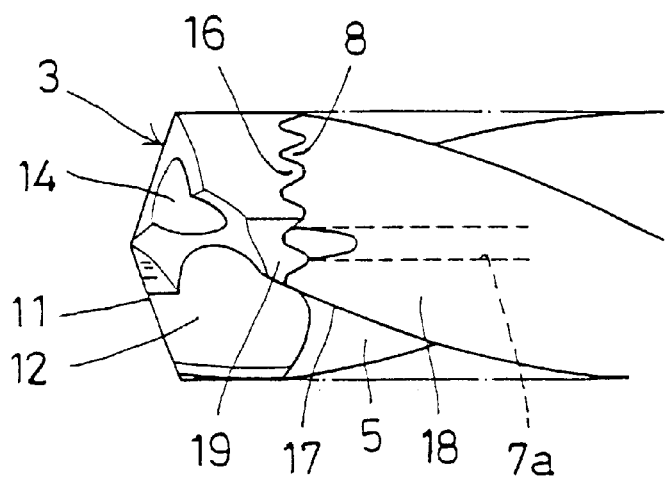
FIG. 9 is a side view of a drill in which an oil hole is open to the tip of the body.
Figure 10:
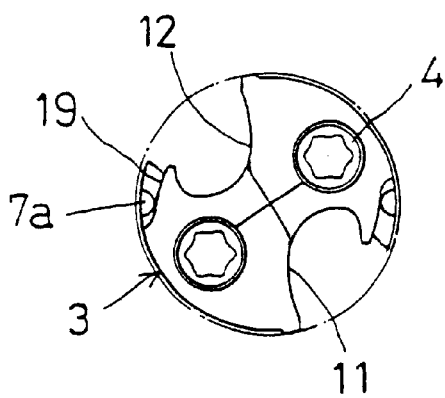
FIG. 10 is a front view of the drill.
Figure 11:
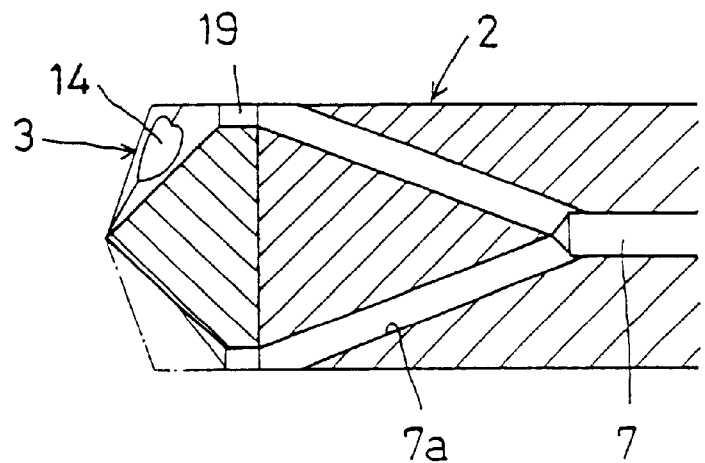
FIG. 11 is a vertical sectional view of the drill.
Figure 12:
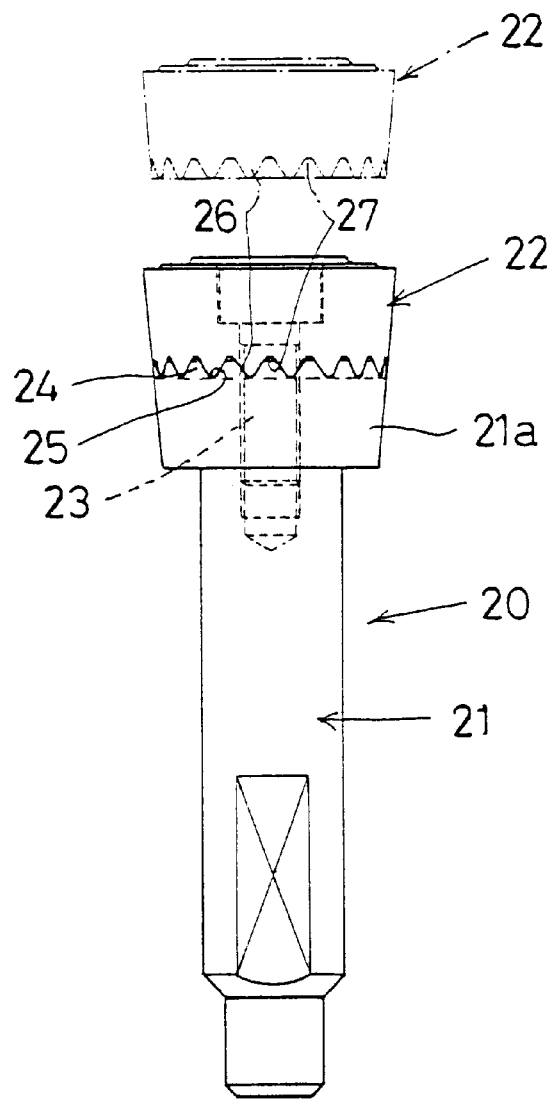
FIG. 12 is a side view of a tool of a second embodiment.
Figure 13:
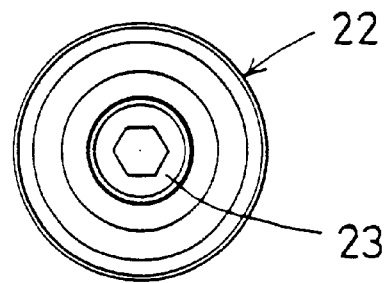
FIG. 13 is a front view of the same.
Figure 14:
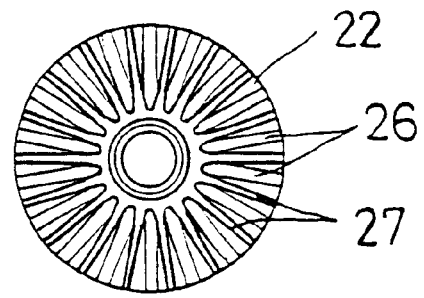
FIG. 14 is an end view of a support surface of the tip.
Figure 15:
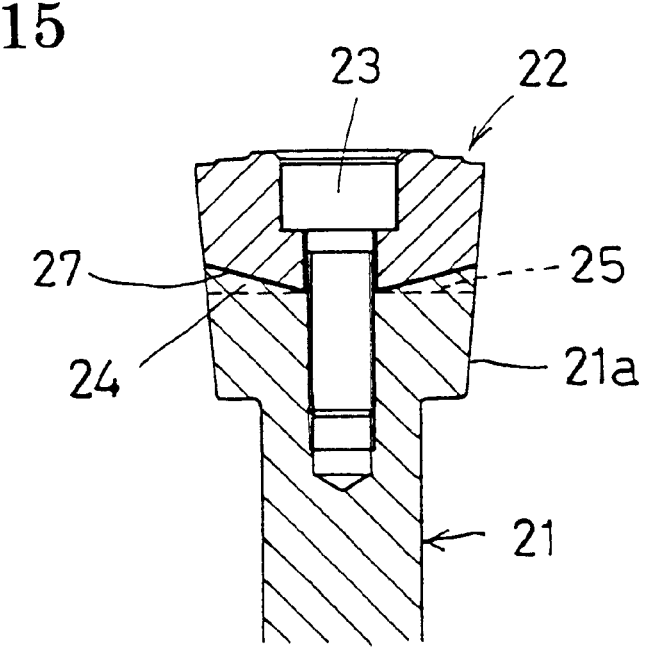
FIG. 15 is a vertical sectional view of the tool of FIG. 12.

FIGS. 9–11 show a drill in which the opening position of the oil hole is changed. An oil hole 7 provided along the axis of the body 2 is branched in a V shape at its intermediate position so that the outlets of the branch oil holes 7a open near a heel 17 at an intersection of the front surface and the outer peripheral surface (land 18) of the body. In the outer periphery of a cutting head 3 fixed to the front surface of the body 2 (in the same manner as with the aforementioned drill), oil grooves 19 communicating with the outlets of the branch oil holes 7a are formed.

The oil grooves 19 are at such positions as to cut out the heel of the cutting head 3 and are open to the helical flutes 12. Through the oil grooves 19, cutting oil will flow into the helical flutes 12 without encountering large discharge resistance. Thus, cutting oil supplied will easily reach the cutting edges, so that the lubricating/cooling effects to the cutout portions increase. Also, the supply amount of cutting oil increases, so that chips are carried away by return oil passing through the helical flutes 12, 5 and discharged smoothly.

The above-described drills have their body 2 formed of steel and the cutting head 3 formed of a cemented carbide which requires sintering.

With the drills of the embodiment, since the protrusions 8 and recesses 9 on the front surface of the body 2 and the protrusions 16 and recesses 15 on the support surface of the cutting head 3 are radially arranged, displacement in pitch of the protrusions and recesses due to variation in shrinkage rate during sintering of the cutting head will not occur. Also, although cemented carbide is more brittle than steel, stress concentration during torque transmission is avoided due to the above-described radial arrangement, and stress acts more uniformly on the protrusions. Thus chipping of the protrusions hardly occurs.

By increasing the height of the radially arranged protrusions 8, 16 and the depth of the recesses 9, 15 toward the outer periphery of the tool, the widths of the protrusions and recesses decrease toward the center. This relaxes restriction to setting of the protrusions and recesses, so that it is possible to increase the area of the torque transmission surface by providing the protrusions and recesses over the entire area of the abutment surface. Also, allowance for engagement between the protrusions and recesses increases at the outer periphery side where the transmission torque increases, so that the dispersion of stress and the surface pressure distribution become uniform. This increases the effect of preventing damage to the fitting surfaces and chipping of the protrusions. Besides, since the cutting head and the body conically fit, misalignment is minimized, so that stability of joining increases.

If at least the tip of the body 2 is formed of cemented carbide, the protrusions 8 and recesses 9 on the front surface of the body can be formed by embossing, which is advantageous from a viewpoint of productivity.

Although the above description has been made with a drill as an example, this invention is applicable to rotary cutting tools other than those for forming holes, such as ball end mills and square end mills and to cutting tools other than rotary tools, too.

FIGS. 12–15 show an embodiment in which it is applied to a throwaway type cutting tool. The tool 20 has a large-diameter tapered portion 21a at the tip of a body (shank) 21, and a cutting head 22 (positive type button tip) secured to the front surface of the large-diameter portion by a clamping screw 23.

A conventional cutting tool had a square shaft provided in the center of the front surface of the large-diameter portion 21a to be received in a square hole formed in a support surface of the tip 22. But in this invention, instead of the square shaft and square hole, protrusions 24 and recesses 25 of a V-shaped section and recesses 27 and protrusions 26 corresponding thereto are provided in a radial arrangement on the front surface of the large-diameter portion 21a of the body and the support surface of the tip 22, respectively.

The protrusions 24 and 26 have their height gradually increasing toward the outer periphery. Thus, the tip of the body 21 and the support surface of the button tip 22 conically fit together, so that the centering function is produced. Further, the corresponding protrusions and recesses individually conically fit together around the axis, so that fixing of the tip stabilizes. Also, the protrusions and recesses, which are arranged at a regular pitch in the shape of a chrysanthemum blossom, also serve as indexing means when the tip is re-set to use an unused blade.

Figure 16:
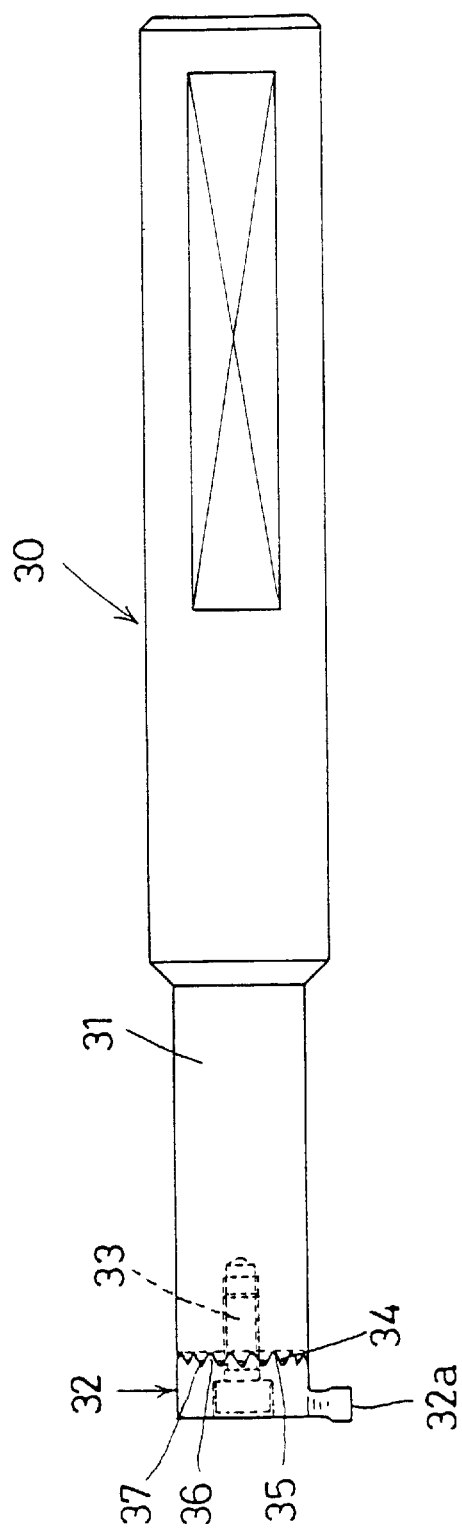
FIG. 16 is a side view of a tool of a third embodiment.
Figure 17:
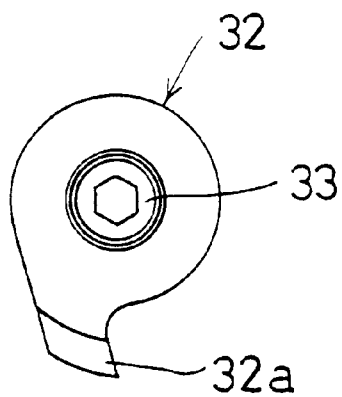
FIG. 17 is a front view of the same.
Figure 18:
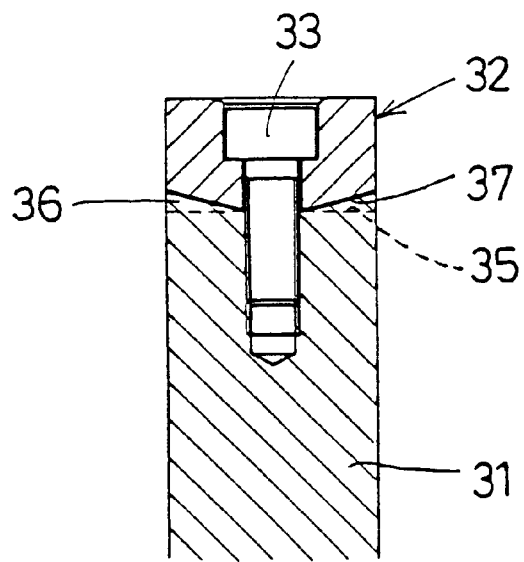
FIG. 18 is a vertical sectional view of the same.
Figure 19:
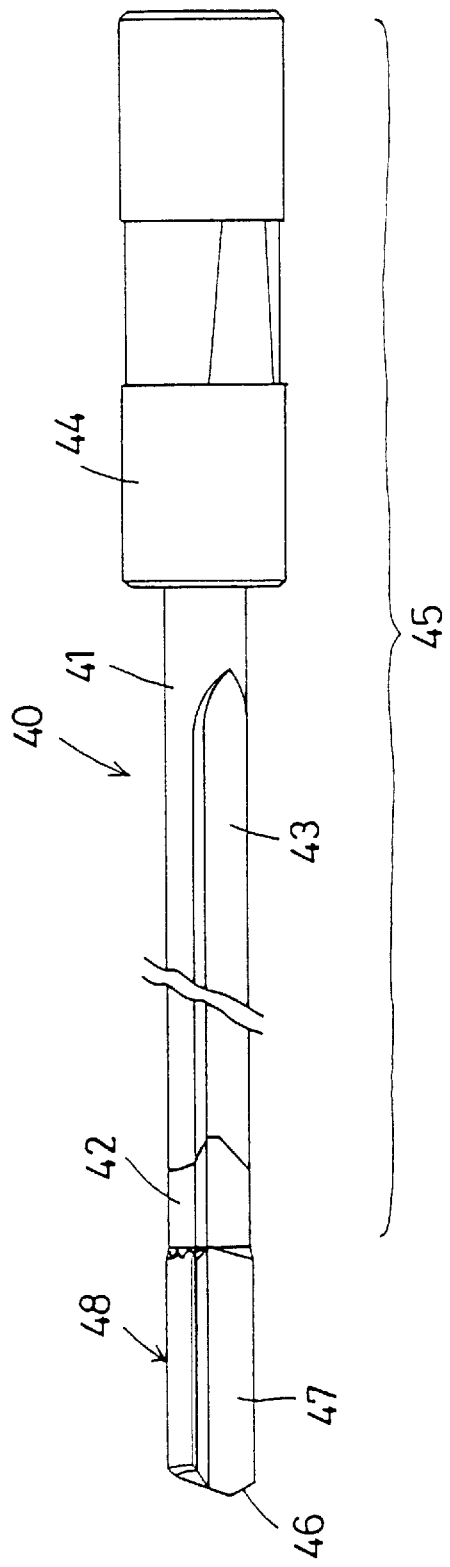
FIG. 19 is a side view showing an embodiment in which it is applied to a gun drill.
Figure 20:
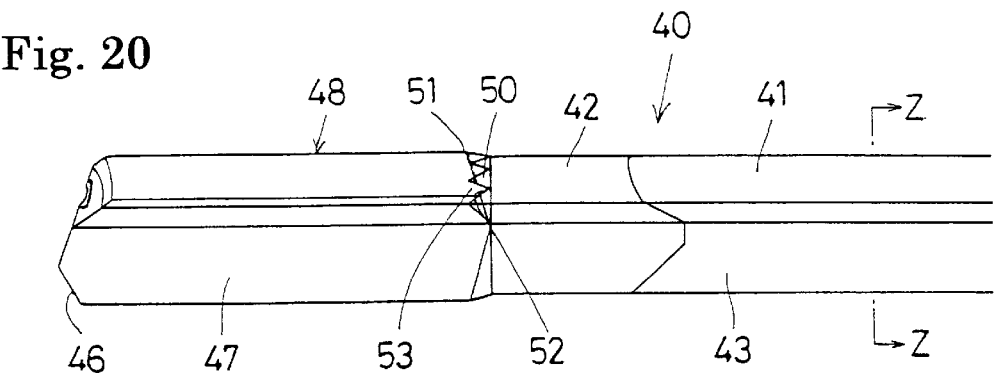
FIG. 20 is a partial enlarged view of the gun drill.
Figure 21:
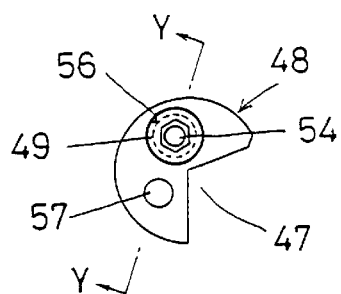
FIG. 21 is a front view of the gun drill.
Figure 22:
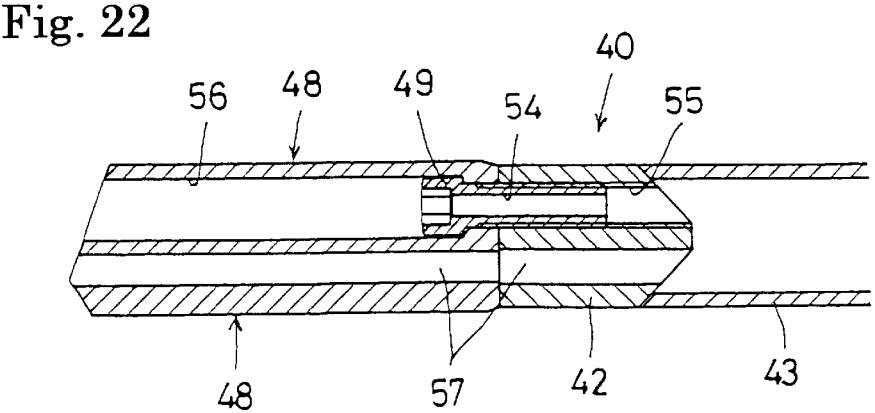
FIG. 22 is a sectional view along line Y—Y of FIG. 22.
Figure 23:
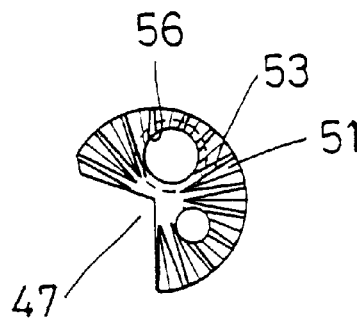
FIG. 23 is a view showing the support surface of the cutting head.
Figure 24:
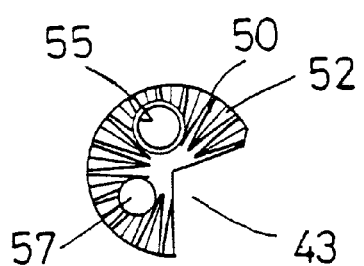
FIG. 24 is a view showing the front surface of the tool body.
Figure 25:
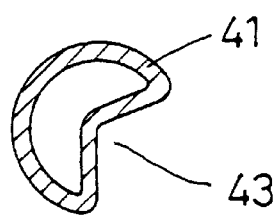
FIG. 25 is a sectional view along line Z—Z of FIG. 20.

FIGS. 16–18 show an embodiment in which it is applied to a boring tool. This tool 30 has a cutting head 32 (circular tip having a blade portion 32a protruding from the outer periphery) secured to the front surface of a body (shank) 31 by a clamping screw 33. This tool 30 also has protrusions 34 and recesses 35 provided on the front surface of the body 31 and recesses 37 and protrusions 36 corresponding thereto on the support surface of the tip 22. The protrusions 34, 36 and recesses 35, 37 are nothing different from the aforementioned protrusions 24, 26 and recesses 25, 27. The shapes of the front surface of the body 31 and the support surface of the tip 32 are the same as with the tool described with reference to FIGS. 9–12.

The shape of the blade portion 32a is not limited to the illustrated grooving blade. By replacing the tip 32 with one having a blade portion of different shape, the form of the boring tool can be changed to one for boring, back boring or threading.

This boring tool 30 improves centering of the tip by conical fitting with the body. Also, a force that tends to rotate the tip about the clamping screw 33 during cutting is borne dispersed to the fitting portions between the protrusions and recesses, so that the tip is prevented stably from turning.

Thus, the protrusion-recess fitting, which characterizes this invention, can also be used for the mounting of the blades of cutting tools.

FIGS. 19–26 show an embodiment in which this invention is applied to a gun drill.

JP utility model publication 49-91889 proposes a gun drill in which a cutting head is detachably coupled to a tool holder (body). But since the gun drill of this publication has a plug/socket connecting portion to transmit torque through keys and key grooves, machining of the connecting portion is essential, so that it is time-consuming to manufacture and the cost is high too. Also, since cutting oil is supplied through an oil hole extending through a coupling element so that the hole diameter is restricted, it is difficult to increase the supply amount of cutting oil.

Thus, the illustrated gun drill 40 of the embodiment has a shank having a straight groove 43 for discharging chip, the shank comprising a pipe portion 41 molded so as to have a section perpendicular to the axis of a ¾ circle and a support member 42 brazed to the tip of the pipe portion 41 by V-shape fitting. An inexpensive tool body 45 is formed by making the shank integral with a driver portion 44. A cutting head 48 having a cutting edge 46 and a straight groove 47 is detachably mounted to the tip of the tool body 45 with a fixing bolt 49. Also, similar to the aforementioned protrusions and recesses, protrusions 50 and recesses 51, and recesses 52 and protrusions 53 are arranged radially on the front surface of the tool body 45 (that is, the support member 42) and the support surface of the cutting head 48, respectively, with their heights and depths varied in diametrical directions. They are fitted together to transmit torque to the cutting head 48. By making it easy to manufacture the tool, the cost is reduced further, and taking advantage of the conical fitting feature, the tool performance has been improved.

A single fixing bolt 49 is used. A bolt hole 56 provided in the cutting head 48 communicate with a cavity formed in the pipe portion 41 through an oil hole 54 formed through the bolt 49 and an oil hole 55 formed in the support member 42 to jet out cutting oil introduced into the pipe portion 41 from the rear end of the driver portion 44 to supply it to the cutting portion.

Further, since the diameter of the oil hole 54 provided in the fixing bolt is restricted, oil holes 57 are separately formed in the support member 42 and the cutting head 48 to increase the oil supply amount.

Figure 26:
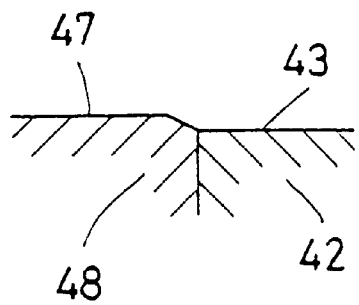
FIG. 26 is a view showing a step on groove surfaces of straight grooves of the cutting head and the tool body.

Also, as shown in FIG. 26, the groove surface of the straight groove 47 is higher than that of the straight groove 43 that connects with it to prevent chip from getting caught at the joint of the groove surfaces.

The gun drill thus structured has the following advantages compared with ordinary gun drills having a cutting head brazed to the tool body. That is, while with such ordinary gun drills, it is necessary to prepare a plurality of drills for different depths of holes to be formed even with the same diameter, the illustrated gun drill can cope with change in the depth of holes to be formed by replacing only the tool body with one having a different length. This is advantageous in the tool cost and tool maintenance.

Also, since the cutting head is detachable, regriding and surface coating are possible without problem. Further, a coating film can be obtained which is high in hardness and bond strength by increasing the temperature of the surface coating because there is no temperature restriction in view of the brazing metal.

Further, it is simpler in structure and easier to manufacture than the gun drill of JP utility model publication 49-91889. This makes it possible to reduce the cost. Also, since the protrusions and recesses are arranged radially for conical fitting, the tool performance can be improved.

Also, since it has additional oil holes, the supply amount of cutting oil increases. Thus it is also superior in the effects of prolonging the life of the cutting edge and preventing of clogging with chips.

Besides, with the tool having a cutting head brazed to the body, if surface coating is carried out by CVD (chemical deposition) method in which the coating temperature is higher than the melting temperature of the brazing metal, problems such as coming off of the cutting head will arise. But since the tool of this invention has no brazed portion, it is possible to form a hard film such as $Al_2O_3$ film or diamond film, which cannot be formed by PVD (physical deposition), with CVD method without restriction.

A tool having a coating film of a hard material provided on the surface of the cutting head, and a tool having its cutting edge formed of sintered body of diamond or cBN (cubic boron nitride) are preferable because they achieve a long life. By using cutting heads having a coating film and cutting heads having their cutting edges formed of cemented carbide, diamond sintered material or cBN sintered material selectively according to the workpiece, it is possible to further increase the effect of prolonging life. This is true not only for gun drills but for any drills to which this invention is applicable.

Even if the arrangement in which the starting end of the chip discharging groove formed in the body is positioned lower than the terminal end of the chip discharge groove formed in the cutting head is employed for ordinary drills having helical flutes, its effect will reveal.

Effect of the Invention

As described above, according to this invention, because the protrusions and recesses on the fitting surfaces provided on the front surface of the tool body and the support surface of the cutting head so as to be opposed to each other are arranged radially, and the protrusions have their height gradually increasing toward the outer periphery and the recesses have their depth gradually increasing so that the front surface of the tool body and the support surface of the cutting head are conically fitted together, it is possible to increase the area of the torque transmission surface by increase the number of the protrusions and recesses. Also, because the allowance for fitting is greater the nearer to the outer periphery of the tool, torque is transmitted with stresses acting on the protrusions and recesses dispersed ideally, decrease in durability due to stress concentration is eliminated. Also, the radial arrangement eliminates lowering of adhesion between the cutting head and the body resulting from variation in shrinkage factor during sintering. Further, since the centripetal effect due to conical fitting is obtained, run-out accuracy during setting improves, so that the machining accuracy increases.

Further, with the cutting tool having the cutting head fixed to the tool body by two bolts provided on both sides of the center of rotation fixation of the cutting head is stable even in machining in which lateral loads act. This assures stability of machining and chipping of the cutting edge decreases.

Also, with the cutting tool in which the inlet of the bolt hole formed in the cutting head is also used as the outlet of the oil hole, machining is possible with internal oil supply by providing oil holes even in a small-diameter tool, which is limited in space. Also, with the cutting tool in which the oil hole is branched inside the body to let cutting oil jet out onto the outer periphery of the body at its tip from the branched oil holes flow into the helical flutes in the tool outer periphery through the oil grooves formed in the outer periphery of the cutting head, the supply of cutting oil is stabilized and the chip dischargability is improved by returning oil. Also, since there is no need to provide oil holes in the cutting head, it is advantageous from the viewpoint of manufacture and cost.

Besides, with the tool in which at least the cutting head is formed of a sintered metal such as cemented carbide, no removal of the sintered skin of the protrusions is needed. Thus productivity is improved and the cost is reduced due to omission of a grinding step.

Also, the gun drill having a cutting head coupled to the tool body by a single fixing bolt formed with an oil hole as well as separate oil hole has a prolonged life of the cutting edge and is free from clogging with chip by increasing the supply amount of cutting oil. The gun drill or the like in which the groove surface of the chip discharge groove in the cutting head is higher than that of the chip discharge groove formed in the body prevents chip from getting caught and thus further improves the effect of preventing clogging with chip.

What is claimed is:

1. A throwaway cutting tool comprising a tool body and a cutting head in abutment with the front surface of said tool body, wherein a plurality of protrusions and recesses of V-shaped section extending from the center of the tool toward its outer periphery are provided radially and alternately with each other on a front surface of said tool body and a support surface of said cutting head, said protrusions having their height gradually increasing and said recesses having their depth gradually increasing from the center of the tool toward its outer periphery, and wherein with the protrusions and the recesses on the front surface of said tool body conically fitted with the corresponding recesses and protrusions on the support surface of said cutting head, said cutting head having a cutting edge is detachably mounted to said tool body with a clamping tool.

2. The throwaway cutting tool as claimed in claim 1 wherein said cutting head is formed with two bolt holes with seats that are parallel to the axis so as to extend through said cutting head from the front surface of said cutting head to said support surface thereof on both sides of the center of the tool, and wherein said cutting head is clamped to said tool body by bolts inserted through said bolt holes and tightened into said tool body.

3. The throwaway cutting tool as claimed in claim 2 wherein an oil hole is provided in said tool body and said cutting head at the center thereof so as to branch in said cutting head and wherein the branched portions of said oil hole communicate with said bolt holes with the outlets of the branched portions of said oil hole formed by the inlets of said bolt holes.

4. The throwaway cutting tool as claimed in claim 1 wherein an oil hole is formed in said tool body, said tool body having in its outer periphery two helical flutes that are symmetrical with respect to the center of the tool, said oil hole extending through the axis of said tool body and branching in a V-shape in said tool body, branched portions of said oil hole opening to the intersection of the front surface and outer peripheral surface of said tool body near a heel, and wherein oil grooves opening to said helical flutes are formed in the outer periphery of said cutting head by cutting out said heel so as to communicate with the outlets of said branched portions of said oil holes.

5. A throwaway gun drill comprising a tool body and a cutting head, said tool body comprising a pipe portion and a support member joined to one end of said pipe portion, said tool body having a section perpendicular to the axis that is a ¾ circle and a straight groove in its outer periphery, wherein a plurality of protrusions and recesses of V-shaped section extending from the center of the drill toward its outer periphery are provided radially and alternately with each other on a front surface of said tool body and a support surface of said cutting head, said protrusions having their height gradually increasing and said recesses having their depth gradually increasing from the center of the drill toward its outer periphery, and wherein with the protrusions and the recesses on the front surface of said tool body conically fitted with the corresponding recesses and protrusions on the support surface of said cutting head, said cutting head having a cutting edge and a straight groove connecting with said straight groove of said tool body is detachably mounted to said tool body with a clamping tool.

6. The throwaway gun drill as claimed in claim 5 wherein a fixing bolt formed with an oil hole along its axis is inserted into a bolt hole with a seat formed in said cutting head at a position offset from the axis of said cutting head and tightened into said support member to couple said cutting head to said support member, wherein said bolt hole is in communication with a cavity of said pipe portion through the oil holes provided in said fixing bolt and said support member, and wherein oil holes are separately formed in said support member and said cutting head so as to communicate with the cavity in said pipe portion.

7. The throwaway cutting tool as claimed in claim 1 wherein the terminal end of the groove surface of a chip discharge groove formed in the outer periphery of said cutting head is higher than the starting end of the groove surface of a chip discharge groove formed in said tool body.

8. The throwaway cutting tool as claimed in claim 1 wherein said cutting head is formed of a sintered material and the sintered skin on said protrusions provided on said cutting head remains without being removed.

9. The throwaway cutting tool as claimed in claim 1 wherein a coating of a hard material is formed on the surface of said cutting head.

10. The throwaway cutting tool as claimed in claim 1 wherein said cutting head has a cutting edge formed of sintered diamond or cBN sintered material.

* * * * *